Patented Feb. 18, 1941

2,232,296

UNITED STATES PATENT OFFICE 2,232,296

PROCESS FOR TREATING LIQUIDS

Oliver M. Urbain and William R. Stemen, Columbus, Ohio, assignors to Charles H. Lewis, Harpster, Ohio No Drawing. Application July 18, 1938, Serial No. 219,900

8 Claims. (Cl. 210—2)

This invention relates to the purification of polluted liquids. More particularly, it relates to precipitation processes for separating polluting substances from liquids and industrial wastes, and removing in general all organic matter present in polluted liquids.

It has been recognized that polluting organic substances are present in liquids in three phases, namely, (1) as suspended matter, (2) as colloidal matter, and (3) as matter in true solution. A complete purification of a liquid requires the elimination therefrom of the organic matter present in each of these forms.

The relative putrescibility of the different fractions of the organic matter present in a polluted liquid is indicated by the per cent of the ten-day bio-chemical oxygen demand attributable to each fraction. In normal sewage these percentages are about as follows:

| | Per cent of the 10-day B. O. D. |
|---|---|
| Suspended matter | 35 |
| Colloidal matter | 53 |
| Dissolved matter | 12 |

Processes for the removal of suspended, colloidal and dissolved matter have heretofore been proposed and have met with a modicum of success. These processes, in general, effect removal of organic matter by coagulation of suspended particles consisting of or having adsorbed thereon the organic matter.

For example, the organic materials in true solution are adsorbed by utilizing an adsorbing agent which is susceptible of coagulation. Certain adsorbents having a sufficient active surface and adsorption capacity are used in proper proportions to effect a substantially complete adsorption of the organic matter in true solution from a polluted liquid. Such an adsorbent agent must be one which is susceptible of coagulation, and possess the property of holding the adsorbed material during the coagulation step.

The organic matter present in colloidal form may be effectively removed by first flocculating such organic matter and thereafter coagulating the suspended matter formed by the flocculation. The flocculation is effected by treating with a desolvator, making the liquid alkaline and adding an efficient electrolyte. The colloids in the alkaline solutions bear high negative charges, and the addition of an electrolyte provides positive ions which combine with the negatively charged colloids and flocculate such colloids in the form of suspended matter.

By "desolvation" is meant the removal of water of solvation from hydrophilic colloids, a necessary step before flocculation of the colloids is possible.

The removal of suspended matter in a liquid is commonly effected by adding thereto a coagulant which gathers together the suspended particles. Such a process is termed coagulation. It will thus be seen that by effecting flocculation of the colloid, and adsorption of the matter in true solution, in the presence of the normally suspended matter, all of the organic matter is brought into a state of suspension which may thereafter be coagulated by the addition of a suitable coagulant.

It is well known that in processes involving coagulation of suspended matter, a period of from two to four hours is required for the precipitate to settle sufficiently before the purified liquid can be drawn off. The sedimentation period required varies with the type of coagulant employed. Of the common coagulants employed, the aluminum and ferric salts produce a precipitate which settles at a slower rate than that produced by ferrous salts. Aluminum coagulants are the most common in liquid treatment processes and these require a sedimentation period of from three to four hours. This necessitates sedimentation basins of enormous capacity where large quantities of liquids are processed. The activated sludge processes and the biological processes require sedimentation tanks of even greater capacity. A further problem met with in the known processes of coagulation is the large volume of sludge obtained by such methods.

It is an object of this invention to provide a water purification process which will effect removal of organic materials in colloidal form, suspended form, or in true solution. A further object is to provide a reagent which will desolvate and flocculate organic materials in colloid form, will adsorb organic materials in true solution and will facilitate coagulation and sedimentation of suspended matter in solutions undergoing treatment.

It is a further object of this invention to provide a process wherein the sedimentation period for coagulation processes can be materially reduced. Another further object of the present invention is to provide a process yielding a much smaller volume of sludge than that obtained by present processes. Further objects of this invention are to provide processes by which suspended matter may be removed from rapidly flowing water and by which the movement of the sludge so obtained might be controlled by forces other than the force of gravity.

Other and further objects of the invention will become apparent as the description of the process is developed.

In our copending application, Serial No. 218,219, filed July 8, 1938, it has been shown that through the use of magnetic materials, such as natural and artificial magnetites, iron, cobalt, nickel, and alloys of these metals, organic materials which have been converted into suspended matter may be much more rapidly coagulated in the form of a sludge having a much smaller volume for the same quantity of organic materials removed. The sedimentation of the suspended matter is effected by adding such magnetic materials thereo and employing an electro-magnetic field below the sedimentation tanks to carry down the magnetic and suspended matter.

In our copending application, Serial No. 219,281, filed July 14, 1938, it has been shown that through the use of natural magnetite, not only may the sedimentation be advantageously effected by magnetic attraction, but that the removal of organic materials in true solution may be effected by adsorption, thus eliminating the necessity of employing adsorbent materials such as Cottrell dust, carbonaceous shale, and Bessemer slag. Natural magnetite possesses a high adsorption capacity which, when combined with its magnetic properties, has been found to make it a particularly advantageous material for use in removing organic matter in true solution as well as organic matter in suspended form.

It has now been found that natural magnetite which has been chlorinated by treatment with chlorine water is highly effective in flocculating colloids to form suspended matter thereof. As will be more fully described, the chlorination of natural magnetites converts a portion of the iron of such a compound into ferric chloride without destroying the magnetic properties of the material. Ferric chloride, when added to a colloidal solution, will in part hydrolyze to form hydrous ferric oxide. This serves as a desolvator for the colloidal particles having a protective water film which must be eliminated before such colloids are susceptible to flocculation. Accordingly, when chlorinated natural magnetite is added to a liquid containing organic matter in colloidal form, the ferric chloride portion of the treated natural magnetite serves as the desolvator. When the solution is made alkaline, the negatively charged colloid particles are brought to their maximum cataphoretic velocity, and the addition of an electrolyte converts the colloid particles into suspensoids. The chlorinated natural magnetite still possesses the adsorbent properties of natural magnetite.

Chlorinated natural magnetite thus becomes an effective water purification agent capable of removing organic matter in true solution by adsorption, capable of effecting desolvation and flocculation of colloidal organic matter due to its ferric chloride content and, due to its magnetic properties, capable of facilitating the coagulation of the natural occurring suspended matter, the suspended matter resulting from desolvation and flocculation of colloidal organic matter and the suspended matter containing the adsorbed organic particles, when employed in connection with an electro-magnetic field. A more detailed description of this newly discovered process now follows.

To effect magnetic flocculation of suspended material and removal of organic matter in true solution and in colloidal form, chlorinated natural magnetite is added, the solution is made alkaline by adding lime, and the usual coagulating agents such as ferrous sulfate, aluminum sulfate, sodium aluminate, chlorinated copperas, etc., are added.

Natural magnetite possesses the properties of effecting adsorption, desolvation, and flocculation, after preliminary treatment. Since magnetite is a ferroso-ferric oxide having the formula $FeO.Fe_2O_3$, it is a combination of ferrous and ferric oxides. It is a very cheap iron ore widely distributed in nature. It is also a waste product of many mining operations and a waste by-product of a number of metallurgical processes.

It has been discovered that a portion of natural magnetites may be converted into ferric chloride by treatment with chlorine water. Artificial magnetite, however, cannot be effectively chlorinated and accordingly is not applicable as a desolvation and flocculation agent.

The chlorination of both natural and artificial magnetites was attempted, but only the natural magnetite yielded a ferric chloride-magnetite product. Samples of each material were graded to a fineness of 60 to 80 mesh and treated with chlorine water with thorough agitation. A determination of iron in solution indicated that the natural magnetite when treated with chlorine water lost between 10 to 12% of its weight in iron, while the artificial magnetite lost less than 0.4% of its weight. This indicates that natural magnetite may be chlorinated to yield a ferric chloride-magnetite mixture in which the ferric chloride is in solution while the magnetite is in suspension. Artificial magnetite cannot be chlorinated to any appreciable extent.

Since natural magnetite may be chlorinated to yield a solution containing ferric chloride in solution and magnetite in suspension, it serves as a highly efficient water purification agent. Chlorination appears to in no way affect its adsorption properties and accordingly the organic matter in true solution may be removed by adsorption.

By treatment of the polluted liquid with a desolvator and then with lime, the colloidal organic matter is desolvated and is negatively charged, and the addition of a suitable electrolyte serves to flocculate the colloids into suspensoids. The addition of the ferric chloride-magnetite mixture in quantity sufficient to result in an addition of 150 to 250 pounds of ferric chloride per million gallons of liquid being treated, to a polluted liquid containing solvated colloids will effect desolvation of these colloids since the ferric chloride will hydrolyze to form hydrous ferric oxide which serves as an efficient desolvator. The addition of lime then effects flocculation of the desolvated colloids, the lime giving a negative charge to the colloids and the remaining ferric chloride serving as the electrolyte. Thus, the colloidal organic matter is readily converted into suspended matter intimately mixed with suspended particles of magnetite. The suspended magnetite particles, in addition, have adsorbed thereon the organic matter in true solution. The remaining organic matter in the polluted liquid will be present as suspended matter. Accordingly, the resultant liquid contains magnetites and organic matter, all of which is present in suspended form. To this mixture may be added the usual coagulants such as aluminum, ferric and ferrous salts, to bring about the coagulation process. A magnetic field may then be applied to the liquid being treated which results in the rapid sedimentation of the flocs formed by the coagulation. The sediment produced by the coagulants will, with the aid of the magnetic field, form a sludge within a very short period of time. The sludge obtained in this manner will be found to have a volume approximately 25% of the volume of sludge normally obtained by coagulation methods not employing magnetic material.

Magnetic flocculation may be effected by installing an electro-magnet in the bottom of the settling tank. The rate of settling of the floc will depend upon the intensity of the magnetic field and the depth of the tank. Electro-magnets exerting a considerable magnetic field are commercially available and may be utilized in this process. The electro-magnets may be constructed as baffle plates, grid-type plates, or in any suitable design to conform with the tank design. The magnetic field should be of such area as to cover the entire bottom of the sedimentation tank. The electro-magnet may be stationary or movable. If it is desired to move the coagulated sediment to a definite location in the tank, this can be done with movable magnets. It has been found advantageous to employ soft core magnets which are magnetized only while being supplied current. This makes possible the control of the movement of the sludge and permits the sludge to be released when this is desired.

The great rapidity of settling of a magnetic floc resulting from the use of chlorinated natural magnetite, under the influence of an electro-magnet, is shown by the following representative set of results:

*Example*

To the first of three aliquot portions of sewage (A) there was added a quantity of ferric chloride solution equivalent to 200 pounds per million gallons and the customary proportional parts of Cottrell dust and hydrated lime. To the second and third portions (B and C) there was added chlorinated natural magnetite equivalent to approximately 200 pounds of ferric chloride per million gallons of liquid being treated and hydrated lime. The samples were vigorously agitated for about five minutes, after which sample C was placed in the field of an electro-magnet, and the rate of settling of the precipitate in centimeters at different time intervals was made on each of the three samples. At the end of the settling period, the volume of sludge was measured for each sample. The results are tabulated in the Table below:

*Table*

|  | A | B | C |
|---|---|---|---|
| 0.5 min. centimeters | 0.2 | 0.2 | 2.5 |
| 1.0 min. do | 2.0 | 3.0 | 5.5 |
| 2.0 min. do | 3.0 | 4.0 | 8.0 |
| 5.0 min. do | 6.5 | 7.0 |  |
| 10.0 min. do | 7.0 | 7.5 |  |
| 15.0 min. do | 8.0 | 8.0 |  |
| Volume of sludge parts | 98.0 | 75.0 | 36.8 |

This data shows that complete sedimentation was effected in less than two minutes when the magnetic flocculation was carried on in the field of an electro-magnet, as compared with a period of fifteen minutes required for complete sedimentation when not carried on in a magnetic field. It also shows that, through the use of a chlorinated natural magnetite in place of conventional adsorbents, and electrolytes, the sludge was reduced in volume even without the use of a magnetic field. This shows the advantageous nature of a chlorinated natural magnetite as a coagulation aid. Tests of B. O. D. of the treated samples indicated a more complete removal of organic matter, both that in true solution and that present as colloids, in samples B and C than in sample A. There is thus shown the efficiency of chlorinated natural magnetite as compared with conventional adsorbents, desolvators and flocculation agents, in the removal of organic materials from polluted liquids. When precipitation is accelerated by a magnetic field, the volume of sludge is compacted to approximately 35% of sludge produced by conventional processes.

The volume of sludge is also less than 60% of the volume produced by the activated sludge process. An examination of the sludge thus produced indicated that this form of sludge is much easier to handle than that produced by other coagulation processes. Thus through the use of chlorinated natural magnetite and a magnetic field, the period of sedimentation is reduced from 75% to 90%, the volume of sludge obtained is reduced by 65%, and the organic materials present are removed regardless of whether they are present in true solution, as colloids, or in suspended form.

It is to be expressly understood that the foregoing description is exemplary only and that the scope of this invention is not to be limited thereby beyond the scope of the subjoined claims.

Having thus described our invention, we claim:

1. A process for treating liquids containing organic impurities which comprises adding thereto chlorinated natural magnetite and precipitating said magnetite and impurities by means of a magnetic field.

2. A process for removing colloidal organic matter from a liquid, which comprises adding thereto chlorinated natural magnetite and lime to desolvate and flocculate said organic matter, and adding a coagulating material to form a mixture of coagulated flocculated organic matter and said magnetite, and precipitating said mixture by means of a magnetic field.

3. A process for removing organic matter in true solution from a liquid, which comprises adding thereto chlorinated natural magnetite to adsorb said organic matter, adding a coagulating material to coagulate the magnetite with adsorbed organic matter, and precipitating the mixture thus formed by means of a magnetic field.

4. A process for removing suspended organic matter from a liquid, which comprises adding thereto a coagulating material and a chlorinated natural magnetite to form a mixture of coagulated suspended organic matter and said magnetite, and precipitating said mixture by means of a magnetic field.

5. A process for removing organic matter from a liquid which comprises adding thereto chlorinated natural magnetite and lime to desolvate and flocculate colloidal organic matter and to adsorb organic matter in true solution, and adding a coagulating material to form thereby a mixture of coagulated flocculated organic matter and coagulated magnetite with adsorbed organic matter, and precipitating said mixture by means of a magnetic field.

6. A process for removing organic matter from a liquid which comprises adding thereto chlorinated natural magnetite and lime to desolvate and flocculate colloidal organic matter, and adding a coagulating material for suspended organic matter to form thereby a mixture of coagulated flocculated organic matter, coagulated suspended organic matter and magnetite, and precipitating said mixture by means of a magnetic field.

7. A process for removing organic matter from a liquid, which comprises adding thereto chlorinated natural magnetite to adsorb organic matter in true solution, and a coagulating material for suspended organic matter, to form thereby a mixture of coagulated magnetite with adsorbed organic matter and coagulated suspended organic matter, and precipitating said mixture by means of a magnetic field.

8. A process for removing organic matter from a liquid, which comprises adding thereto chlorinated natural magnetite and lime to desolvate and flocculate colloidal organic matter in said liquid and to adsorb organic matter in true solution, and adding a coagulating material for suspended organic matter to form thereby a mixture of coagulated flocculated organic matter, coagulated magnetite, with adsorbed organic matter and coagulated suspended organic matter, and precipitating said mixture by means of a magnetic field.

OLIVER M. URBAIN.
WILLIAM R. STEMEN.